United States Patent
Woll et al.

(10) Patent No.: US 12,107,239 B2
(45) Date of Patent: Oct. 1, 2024

(54) METHOD FOR MATCHING DATA OF A FIRST CONTROL UNIT WITH A SECOND CONTROL UNIT FOR DETERMINING PRECISE PREDICTIVE VALUES

(71) Applicant: Robert Bosch GmbH, Stuttgart (DE)

(72) Inventors: Christoph Woll, Gerlingen (DE); Volker Doege, Dischingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 339 days.

(21) Appl. No.: 17/621,442

(22) PCT Filed: Jul. 21, 2020

(86) PCT No.: PCT/EP2020/070519
§ 371 (c)(1),
(2) Date: Dec. 21, 2021

(87) PCT Pub. No.: WO2021/032385
PCT Pub. Date: Feb. 25, 2021

(65) Prior Publication Data
US 2022/0352558 A1    Nov. 3, 2022

(30) Foreign Application Priority Data
Aug. 20, 2019 (DE) .................... 10 2019 212 426.7

(51) Int. Cl.
*H01M 10/42* (2006.01)
*B60L 58/12* (2019.01)
(Continued)

(52) U.S. Cl.
CPC .......... *H01M 10/425* (2013.01); *B60L 58/12* (2019.02); *B60L 58/16* (2019.02);
(Continued)

(58) Field of Classification Search
CPC .......... H01M 10/425; H01M 10/4207; H01M 10/482; H01M 10/486; B60L 58/12;
(Continued)

(56) References Cited

U.S. PATENT DOCUMENTS

2010/0121588 A1* 5/2010 Elder .................... B60L 58/16
702/85
2015/0251556 A1  9/2015 Meyer
(Continued)

FOREIGN PATENT DOCUMENTS

CN  104816813 A  8/2015
DE  102013209443 A1  11/2014
(Continued)

OTHER PUBLICATIONS

International Search Report for PCT/EP2020/070519, Issued Oct. 5, 2020.

*Primary Examiner* — Minh Q Phan
(74) *Attorney, Agent, or Firm* — NORTON ROSE FULBRIGHT US LLP; Gerard A. Messina

(57) ABSTRACT

A method for matching data of a first control unit for controlling an electrical energy storage unit, which includes a plurality of electrochemical energy stores, with a second control unit for determining precise predictive values.

10 Claims, 3 Drawing Sheets

(51) Int. Cl.
*B60L 58/16* (2019.01)
*H01M 10/48* (2006.01)
*H02J 7/00* (2006.01)

(52) U.S. Cl.
CPC ..... *H01M 10/4207* (2013.01); *H01M 10/482* (2013.01); *H01M 10/486* (2013.01); *H02J 7/0014* (2013.01); *H02J 7/0048* (2020.01); *H02J 7/005* (2020.01); *B60L 2240/545* (2013.01); *B60L 2240/547* (2013.01); *B60L 2240/549* (2013.01); *H01M 2010/4271* (2013.01); *H01M 2220/20* (2013.01); *H01M 2220/30* (2013.01); *H02J 2310/48* (2020.01)

(58) Field of Classification Search
CPC ......... B60L 58/18; H02J 7/005; H02J 7/0048; H02J 7/0014
See application file for complete search history.

(56) References Cited

U.S. PATENT DOCUMENTS

| | | |
|---|---|---|
| 2016/0039419 A1 | 2/2016 | Wampler et al. |
| 2017/0328956 A1 | 11/2017 | Zhang |
| 2020/0393516 A1* | 12/2020 | Gao ................ H02J 7/0048 |

FOREIGN PATENT DOCUMENTS

| | | |
|---|---|---|
| EP | 2124288 A1 | 11/2009 |
| JP | 2018063947 A | 4/2018 |

* cited by examiner

METHOD FOR MATCHING DATA OF A FIRST CONTROL UNIT WITH A SECOND CONTROL UNIT FOR DETERMINING PRECISE PREDICTIVE VALUES

FIELD

The present invention is directed to a method for matching data of a first control unit for controlling an electrical energy storage unit, which includes a plurality of electrochemical energy stores, with a second control unit for determining precise predictive values, a device for operating an electrical energy storage unit as well as a use of the method.

BACKGROUND INFORMATION

The software program status of a battery management system (BMS) of a battery control unit (BCU) of today, contains not only functions for operating the battery but also an associated initial data input. These data are threshold values for current or temperature, parameters of a battery model, various characteristics, characteristic maps, factors. Since the battery's "historic behavior" also plays a crucial role in the precise description of its condition, the data input of an electrochemical model is extremely complex. In particular, the data are based on comprehensive laboratory and vehicle measurements, which take into account different aging states and aging processes to be able to predict, in particular, a state of charge (SoC), which is as accurate as possible, and thus an accurate vehicle range. The data needed for this purpose are presently stored in the battery control unit only in a rudimentary manner; for example, factors are used instead of necessary characteristic maps for the sake of simplicity, since the enormous quantity of data would take up too much storage space in the battery control unit memory. However, this results in an imprecise predicted vehicle range.

China Patent Publication No. CN 104816813 describes a battery management redundancy control system for a marine lithium battery pack. The battery management redundancy control system includes a main control unit, an auxiliary control unit, a standby main control unit, a battery pack module, a wireless ZIGBEE redundancy module, an upper computer background monitoring module and an independent line redundancy module. If a bus is error-free, the main control unit and the auxiliary control unit communicate via the bus. The main control unit and the auxiliary control unit are in contact when running through life signs; if the bus is error-free, the main control unit is in standby mode, and the auxiliary control unit is connected via the bus. In the case of bus errors, the ZIGBEE wireless redundancy module detects the status key parameters of the accumulator module and uploads the detected data to the main control unit or to the main control unit in standby mode. The upper computer background monitoring module is used to monitor the battery parameters and to download control instructions, and the independent line redundancy module is used for the direct control or emergency control of the battery pack module by the upper computer background monitoring module.

German Patent Application No. DE 10 2013 209 443 A1 describes a method for authenticating measured data of a battery, which includes at least one battery module including an assigned module control unit, and a central control unit, including the following steps: a) detecting measured data of battery units by the module control unit; b) ascertaining at least one additional information carrier, which is configured to authenticate the measured data, by the module control unit; c) transferring the measured data and the additional information carrier from the module control unit to the central control unit; d) validating the measured data by the central control unit, based on the additional information carrier. A data structure, a computer program and a battery management system are also indicated, which are configured to carry out the method, as well as a battery and a motor vehicle, whose drive system is connected to a battery of this type.

An object of the present invention is to further improve the related art. This object is achieved by the features of example embodiments of the present invention.

SUMMARY

A method according to the present invention is provided for matching data of a first control unit of an electrical energy storage unit, which includes a plurality of electrochemical energy stores, with a second control unit for determining precise predictive values. In accordance with an example embodiment of the present invention, the method advantageously includes the following steps:
  a) providing a multiplicity of data of an electrochemical model of the electrical energy storage unit in groups for different aging levels of the electrical energy storage unit with the aid of a memory of the second control unit;
  b) providing at least one of the groups of data with the aid of a memory of the first control unit;
  c) detecting first voltage variables, which represent a voltage of the electrochemical energy store;
  d) forming a mean value of the detected first voltage variables;
  e) wirelessly matching at least one group of data of the memory of the first control unit with a group of data of the memory of the second control unit if a voltage difference between the formed mean value of the detected first voltage variables and a model voltage variable calculated with the aid of the group of data provided by the memory of the first control unit exceeds a predefined threshold value.

As a result, data of an electrochemical model, for example battery model parameters, may be provided with the aid of a memory of the second control unit, by means of which different degrees of aging of a battery may be very accurately described. The data are stored in the memory of the second control unit, for example in a cloud, and are assigned to the memory of the first control unit under certain conditions. A memory of a control unit advantageously does not have to be expanded, only a wireless data link to a cloud needs to be integrated.

During step c), the voltage of the electrochemical energy store should not change (highly) dynamically, since this results in an increased measurement inaccuracy of the voltage values. In an electrically drivable vehicle, which includes the electrical energy storage unit, the conditions for detecting the voltages are best during a travel at constant speed.

Within the sense of the present invention, an energy storage unit is understood to be an electrical energy storage unit which includes a plurality of electrochemical energy stores, from which electrical energy may be withdrawn or supplied thereto and withdrawn therefrom. The electrical energy store is designed as a charge store and/or as a magnetic energy store and/or an electrochemical energy store. An electrochemical energy store is, in particular, a rechargeable battery or an accumulator.

Further advantageous specific embodiments of the present invention are disclosed herein.

The method according to an example embodiment of the present invention further includes the following steps:
- f) detecting second voltage variables, which represent a voltage of the electrochemical energy store;
- g) forming a mean value of the detected second voltage variables;
- h) generating a signal as a function of a voltage difference between the formed mean value of the detected second voltage variables and a model voltage variable calculated with the aid of the matched group of data.

Due to a comparison measurement using steps f) through h), for example in a subsequent driving cycle, it may be established whether a deviation between the formed mean value of the detected second voltage variables and a model voltage variable calculated with the aid of the matched group of data continues to exist after a matching of the data. Errors in the electrical energy storage unit may be established thereby at an early point. If no relevant deviation is established, the electrical energy storage unit may continue to be operated with the aid of the matched group of data.

The generated signal is advantageously an error signal if the voltage difference exceeds a predefined threshold value. If a deviation which exceeds a predefined threshold value occurs between the formed mean value of the detected second voltage variables and a model voltage variable calculated with the aid of the matched group of data, the electrical energy storage unit appears to have an error. A user of the electrical energy storage unit, for example a driver of an electrically drivable vehicle, which includes the electrical energy storage unit, may be notified of the error by an electrical, visual, acoustic and/or haptic error signal for the purpose of taking the electrical energy storage unit to a repair shop for inspection.

The method according to an example embodiment of the present invention further includes the following steps:
- c.1) comparing an ascertained utilization variable, which represents a cyclical aging and/or a calendar aging of the electrical energy storage unit and/or the electrochemical energy store, with a predefined threshold value; and/or
- c.2) checking whether the electrical energy storage unit is operating free of errors;
- c.3) carrying out step c) if the ascertained utilization variable exceeds the predefined threshold value and/or the electrical storage unit is working free of errors.

Since a cell of the electrochemical energy store does not age abruptly, it is sufficient if a comparison measurement according to step c) is carried out after a certain number of trips of an electrically drivable vehicle, which includes the electrical energy storage unit, for example after 20 trips in each case and/or after a predefined period of time, for example after two weeks. Both the cyclical and the calendar aging are taken into account equally thereby.

The method according to an example embodiment of the present invention further includes the following step:
- d.1) discarding outliers of the detected voltage variables.

The electrical energy storage unit of an electric vehicle is made up of approximately 100 electrochemical energy stores, which are connected to each other in series and/or in parallel. All voltage variables which represent a voltage of the individual electrochemical energy stores are measured, for example, with the aid of voltage sensors. After all voltage variables are present, a check takes place of whether voltage outliers are present, since they are not included in the formation of the mean value of the electrochemical energy store. More precise predictive values are made possible thereby.

The method according to an example embodiment of the present invention further includes the following steps:
- d.2) comparing a dispersion measure of the detected voltage variables with a predefined threshold value;
- d.3) carrying out step d) if the dispersion measure does not exceed the predefined threshold value.

If the dispersion of the voltage variables exceeds a predefined threshold value, a state of charge balancing between the electrochemical energy stores is necessary. Due to the check, a correct comparison with the calculated value of the model voltage variable may take place, by means of which more precise predictive values are made possible.

The method according to an example embodiment of the present invention further includes the following steps:
- e.1) checking an instantaneous operating state of the electrical energy storage unit;
- e.2) carrying out step e) when the electrical energy storage unit is not in operation.

A matching of at least one group of data of the memory of the first control unit with a group of data of the memory of the second control unit is advantageously carried out when the electrical energy storage unit is not in operation, for example immediately after the end of a trip of an electrically drivable vehicle.

Data for different types of electrical energy storage units, which may be accessed by further first control units, are further present situated in the memory of the second control unit. Data for new electrochemical energy storage units, for example having a different cell chemistry, are also advantageously present in the memory of the second control unit, by means of which correct data for a corresponding electrochemical model are available for matching data upon a change of the electrical energy storage unit. If a state of the electrical energy storage unit changes in that, for example, it ages to a greater degree than calculated by the electrochemical model, new parameters may be made available. Individual driving behavior and/or applied charging strategies for predicting performance and vehicle range may also be better taken into account.

The data of the electrochemical model of the electrochemical energy store include one-dimensional or multidimensional characteristic maps and/or parameters, in particular temperature, current, state of charge, state of health.

Data of the electrochemical model may be kept up to date thereby, by means of which a performance prediction and a predicted vehicle range may be made more precise, by means of which electrically drivable vehicles become more fun to drive, and a greater vehicle range may be achieved.

A device according to an example embodiment of the present invention for operating an electrical energy storage unit includes a plurality of electrochemical energy stores, at least one sensor for detecting electrical variables of the electrochemical energy stores as well as at least one means, in particular a first control unit, for controlling the electrical energy storage unit, which are configured to carry out the steps of the method according to the present invention.

The method according to an example embodiment of the present invention is advantageously used in electrical energy storage systems for electric vehicles, hybrid vehicles, plug-in hybrid vehicles, aircraft, pedelecs or e-bikes, for portable devices for telecommunications or data processing, for electric handheld tools or kitchen appliances, as well as in stationary stores for storing, in particular, renewably generated electrical energy.

BRIEF DESCRIPTION OF THE DRAWINGS

Exemplary embodiments of the present invention are illustrated in the figures and explained in greater detail in the description below.

DETAILED DESCRIPTION OF EXAMPLE EMBODIMENTS

Figure 1:
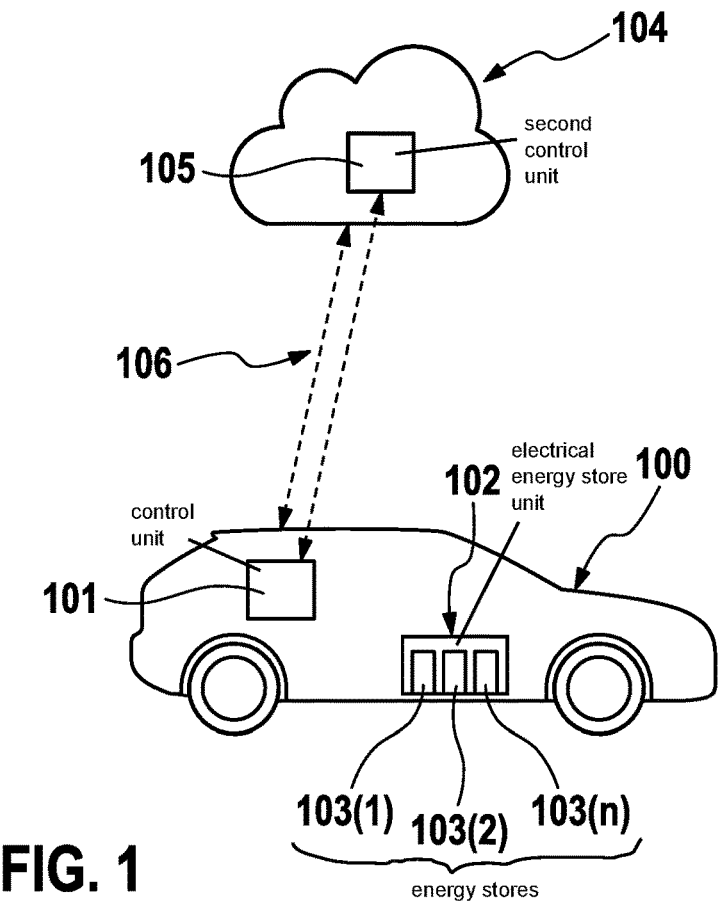
FIG. 1 shows a schematic representation of one specific embodiment of the device according to an example embodiment of the present invention.

The same reference numerals designate the same device components in all figures.

FIG. 1 shows a schematic representation of one specific embodiment of the device according to an example embodiment the present invention. An electrically drivable vehicle 100 includes a first control unit 101, including a memory, an electrical energy storage unit 102 including a plurality of electrochemical energy stores 103(1), 103(2), 103(n), control unit 101 communicating with a second control unit 105 without cables, for example with the aid of a radio connection. Second control unit 105, including a memory, is situated spatially separated from the vehicle, for example in an IT infrastructure 104, which is available via the Internet (cloud computing). Among other things, data of an electrochemical model of electrical energy storage unit 102 and/or electrochemical energy stores 103(1), 103(2), 103(n) are stored in the memory of first control unit 101. These data are characteristic maps, which are dependent on temperature, current, state of charge and further physical variables, i.e., multidimensional characteristic maps, and are thus highly memory-intensive.

Figure 2:
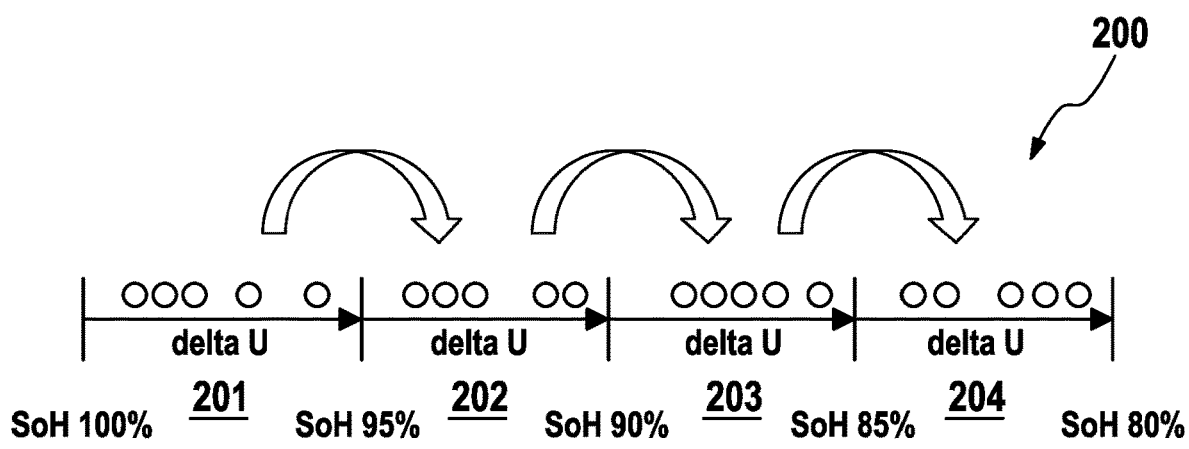
FIG. 2 shows an example of a representation of a group of data.

FIG. 2 shows an example of a representation of a group of data 200. The data are grouped (clustered) according to different battery aging levels (SoH), from a new state to varying degrees of aging up to the state in which the electrical energy storage unit is to be replaced due to its excessively low residual capacity, for example 80%.

The group results from the difference between the model voltage variable calculated with the aid of the electrochemical model and the detected voltage variable, for example the voltage of the electrical energy storage unit measured with the aid of a voltage sensor. If a certain voltage difference from the two voltage variables is present, which is greater than the measuring accuracy of the voltage sensor and a signal-processing A/D converter, a matching from a next group may take place.

The granularity of the grouping, the conditions under which a comparison measurement is to take place, and the frequency of the comparison measurement determine the quality of the method according to the present invention.

The sensors plus electronics have an accuracy of approximately +/−25 mV, i.e., the measuring accuracy of the cell voltage measurement is approximately 50 mV. A deviation of the voltage may be reliably assumed only if the difference between the calculated model voltage variable and the detected voltage variable is greater than this 50 mV.

Approximately 20 groupings result for an electrical energy storage unit 102 which includes lithium-ion energy stores 103(1), 103(2), 103(n) operated in the voltage range of 4.2 V to approximately 3 V. However, a noticeable state of charge reduction of approximately 10% results only in the case of a voltage difference of 70 mV, wherefrom approximately 10 groupings result. Electrical energy storage unit 102 is operated from the new state, which has a charge capacity of 100%, to the aged stage, which has a charge capacity of 80%. An equal division of this range results in 5% increments and thus four groupings 201, 202, 203, 204, which are sufficient for lithium-ion energy stores available today.

A finer granularity is advantageously possible with added complexity in the aging measurements of electrochemical energy stores 103(1), 103(2), 103(n) and the determination of the parameters of the electrochemical energy stores.

Figure 3A:
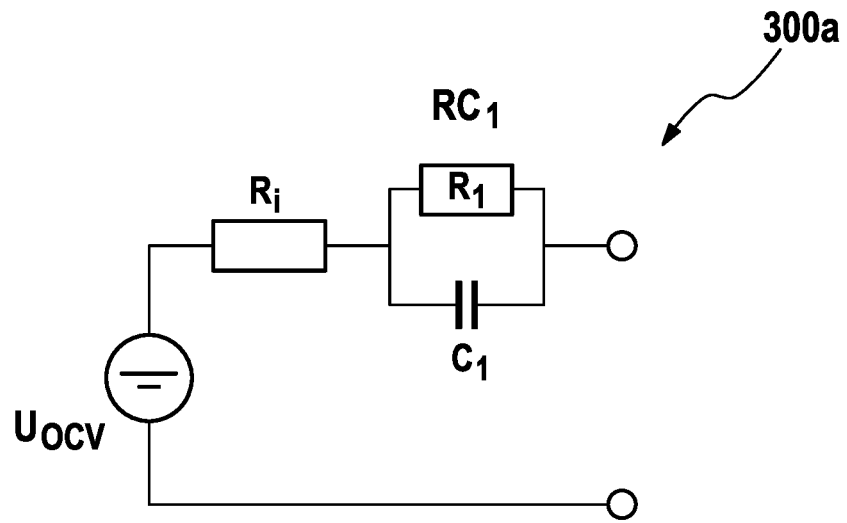
FIG. 3A shows a schematic representation of a first electrochemical model.
Figure 3B:
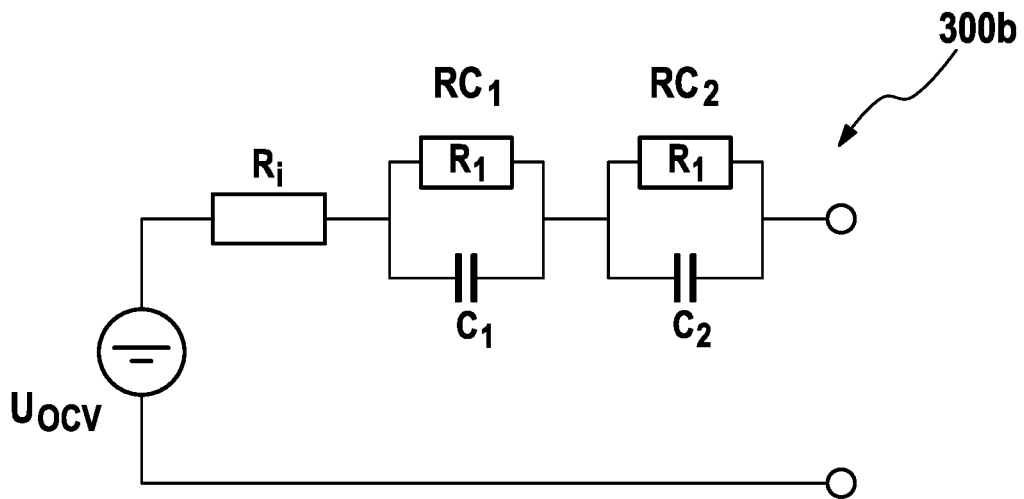
FIG. 3B shows a schematic representation of a second electrochemical model.

FIG. 3A shows a schematic representation of a first electrochemical model 300a. Electrochemical model 300a of electrical energy storage unit 102 is usually depicted in the battery management system of first control unit 101 as an equivalent diagram model in the form of a no-load voltage source and an R-RC element. Other versions are electrochemical models 300b which include multiple RC elements connected in series to the preceding RC elements, as illustrated in FIG. 3B. The parameters for these electrochemical models are thus a no-load voltage (UOCV), two resistance values (Ri and R1) as well as a capacitor capacitance (C1).

Figure 4:
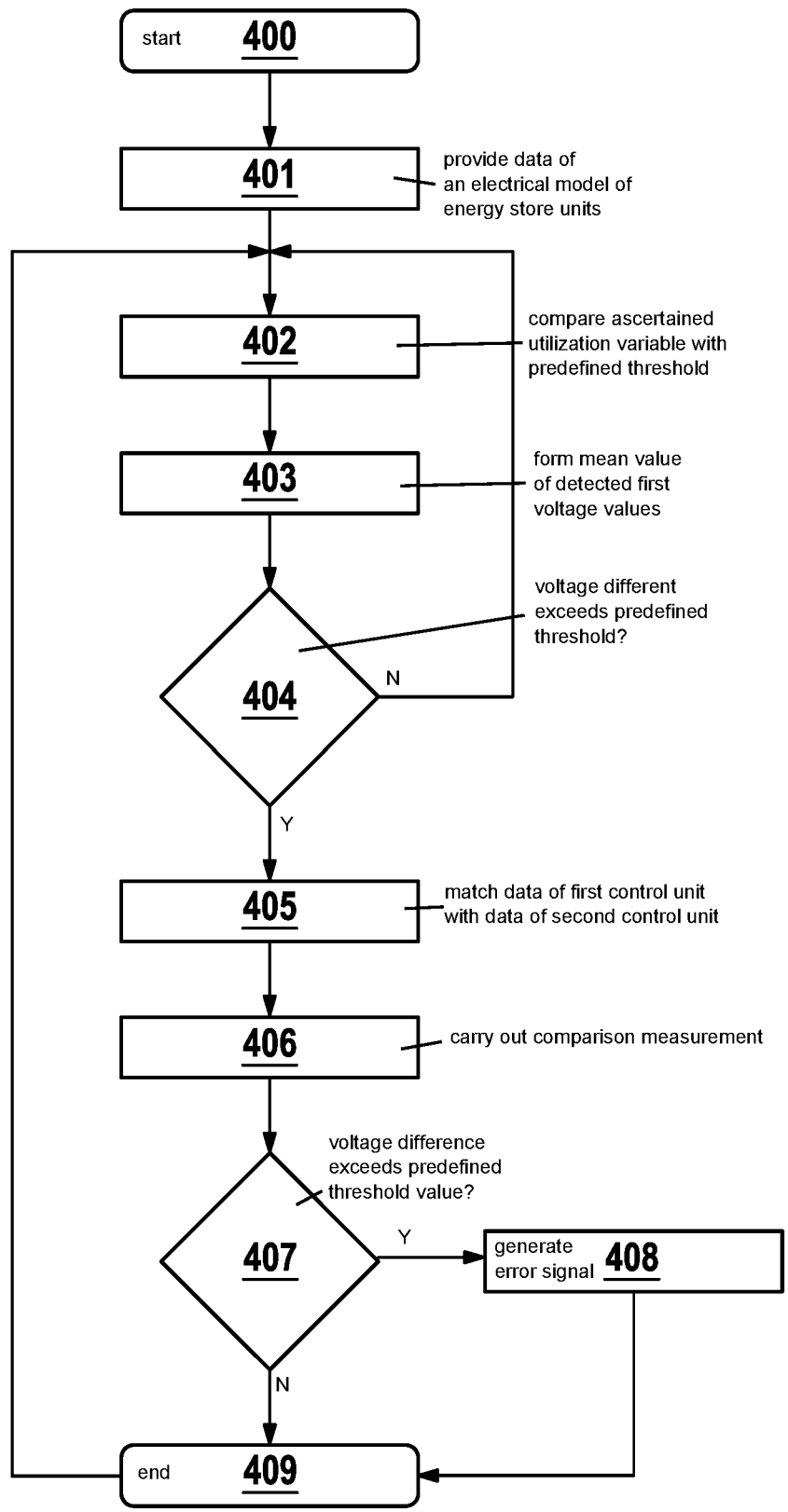
FIG. 4 shows a flowchart of one specific example embodiment of the method according to the present invention.

FIG. 4 shows a flowchart of one specific embodiment of the method according to an example embodiment of the present invention for matching data of a first control unit 101 for controlling an electrical energy storage unit 102, including a plurality of electrochemical energy stores 103(1), 103(2), 103(n), with a second control unit 105 for determining precise predictive values. The method is started in step 400. In step 401, a multiplicity of data of an electrochemical model of electrical energy storage unit 102 is provided in groups for different aging levels of electrical energy storage unit 102 with the aid of a memory of the second control unit 105.

Step 402 includes a comparison of an ascertained utilization variable, which represents a cyclical aging and/or a calendar aging of electrical energy storage unit 102 and/or electrochemical energy stores 103(1), 103(2), 103(n), with a predefined threshold value. Step 402 further includes a check of whether electrical energy storage unit 102 is operated free of errors. If the ascertained utilization variable exceeds the predefined threshold value, and/or if electrical energy storage unit 102 is operating free of errors, first voltage variables are detected, which represent a voltage of electrochemical energy stores 103(1), 103(2), 103(n).

Step 402 further includes a discarding of outliers of the detected voltage variables and a comparison of a dispersion measure of the detected voltage variables with a predefined threshold value. If the dispersion measure does not exceed the predefined threshold value, a mean value of the detected first voltage values is formed in step 403.

In step 404 it is checked whether a voltage difference between the formed mean value of the detected first voltage variables and a model voltage variable calculated with the aid of the group of data provided by the memory of first control unit 101 exceeds a predefined threshold value. If the threshold value is exceeded, a wireless matching of at least one group of data of the memory of first control unit 101 with a group of data of the memory of second control unit 105 takes place in step 405, otherwise the method is continued in step 402. The threshold value is predefined according to the granularity of the groups of data.

More precise predictions of the remaining range and withdrawable power are made possible by matching the data. An easy adaptation to design variant-specific adaptations and new electrical energy storage units is made possible.

A comparison measurement is carried out in step 406. For this purpose, second voltage variables, which represent a voltage of electrochemical energy stores 103(1), 103(2), 103(n), are detected in step 406, and a mean value of the detected second voltage variables is formed.

Step 407 includes a generation of a signal as a function of a voltage difference between the formed mean value of the detected second voltage variables and a model voltage variable calculated with the aid of the matched group of data. If the voltage difference exceeds a predefined threshold value, an error signal is generated in step 408.

The method is ended in step 409 or continued in step 402 and repeated cyclically.

The method according to the present invention is advantageously suitable for practically any electrochemical energy store and, in principle, for any automotive component which has a connection to an external memory medium, for example a connection to cloud computing.

What is claimed is:

1. A method for matching data of a first control unit for controlling an electrical energy storage unit, including a plurality of electrochemical energy stores, with a second control unit for determining precise predictive values, the method comprising:
   a) providing a multiplicity of data of an electrochemical model of the electrical energy storage unit in groups for different aging levels of the electrical energy storage unit using a memory of the second control unit;
   b) providing at least one of the groups of data using a memory of the first control unit;
   c) detecting first voltage variables, which represent a voltage of the electrochemical energy stores;
   d) forming a mean value of the detected first voltage variables;
   e) wirelessly matching at least one group of data of the memory of the first control unit with a group of data of the memory of the second control unit when a voltage difference between the formed mean value of the detected first voltage variables and a model voltage variable calculated using the group of data provided by the memory of the first control unit exceeds a predefined threshold value.

2. The method as recited in claim 1, further comprising:
   f) detecting second voltage variables, which represent a voltage of the electrochemical energy stores;
   g) forming a mean value of the detected second voltage variables;
   h) generating a signal as a function of a voltage difference between the formed mean value of the detected second voltage variables and a model voltage variable calculated using the matched group of data.

3. The method as recited in claim 2, wherein the generated signal is an error signal when the voltage difference exceeds a predefined threshold value.

4. The method as recited in claim 1, further comprising:
   c.1) comparing an ascertained utilization variable, which represents a cyclical aging and/or a calendar aging of the electrical energy storage unit and/or the electrochemical energy stores, with a predefined threshold value; and/or
   c.2) checking whether the electrical energy storage unit is working free of errors;
   c.3) carrying out step c) when the ascertained utilization variable exceeds the predefined threshold value and/or the electrical storage unit is working free of errors.

5. The method as recited in claim 1, further comprising:
   d.1) discarding outliers of the detected first voltage variables.

6. The method as recited in claim 1, further comprising:
   d.2) comparing a dispersion measure of the detected voltage variables with a second predefined threshold value;
   d.3) carrying out step d) when the dispersion measure does not exceed the second predefined threshold value.

7. The method as recited in claim 1, further comprising:
   e.1) checking an instantaneous operating state of the electrical energy storage unit;
   e.2) carrying out step e) when the electrical energy storage unit is not in operation.

8. The method as recited in claim 1, wherein the data of the electrochemical model of the electrochemical energy stores include one-dimensional or multidimensional characteristic maps and/or parameters, including a temperature, a current, a state of charge, or a state of health.

9. The method as recited in claim 1, wherein the electrical energy storage unit is in an electric vehicle, or a hybrid vehicle, or a plug-in hybrid vehicle, or an aircraft, or a pedelec, or an e-bike, or for a portable device for a telecommunication system, or a data processing system, or for an electric handheld tool, or a kitchen appliance, or a stationary store for storing renewably generated electrical energy.

10. A device for operating an electrical energy storage unit which includes a plurality of electrochemical energy stores, the device comprising:
   at least one sensor configured to detect electrical variables of the electrochemical energy stores; and
   a first control unit configured to control the electrical energy storage unit, the first control unit being configured to:
      a) provide a multiplicity of data of an electrochemical model of the electrical energy storage unit in groups for different aging levels of the electrical energy storage unit using a memory of a second control unit;
      b) provide at least one of the groups of data using a memory of the first control unit;
      c) detect, using the at least one sensor, first voltage variables, which represent a voltage of the electrochemical energy stores;
      d) form a mean value of the detected first voltage variables;
      e) wirelessly match at least one group of data of the memory of the first control unit with a group of data of the memory of the second control unit when a voltage difference between the formed mean value of the detected first voltage variables and a model voltage variable calculated using the group of data provided by the memory of the first control unit exceeds a predefined threshold value.

* * * * *